US012595378B2

(12) United States Patent
Miyake

(10) Patent No.: US 12,595,378 B2
(45) Date of Patent: Apr. 7, 2026

(54) WATER-SOLUBLE SHEET-LIKE COLORING MATERIAL, WATER-SOLUBLE SHEET-LIKE COLORING MATERIAL SET, AND PAINT SET

(71) Applicant: KABUSHIKI KAISHA PILOT CORPORATION, Tokyo-to (JP)

(72) Inventor: Takahito Miyake, Tokyo-to (JP)

(73) Assignee: KABUSHIKI KAISHA PILOT CORPORATION, Tokyo-To (JP)

( * ) Notice: Subject to any disclaimer, the term of this patent is extended or adjusted under 35 U.S.C. 154(b) by 768 days.

(21) Appl. No.: 17/781,935

(22) PCT Filed: Dec. 4, 2019

(86) PCT No.: PCT/JP2019/047332
§ 371 (c)(1),
(2) Date: Jun. 2, 2022

(87) PCT Pub. No.: WO2021/111537
PCT Pub. Date: Jun. 10, 2021

(65) Prior Publication Data
US 2022/0372305 A1　Nov. 24, 2022

(51) Int. Cl.
| | |
|---|---|
| *C09D 5/06* | (2006.01) |
| *C09D 7/20* | (2018.01) |
| *C09D 7/45* | (2018.01) |
| *C09D 7/61* | (2018.01) |
| *C09D 7/63* | (2018.01) |
| *C09D 7/65* | (2018.01) |
| *C09D 101/02* | (2006.01) |
| *C09D 129/04* | (2006.01) |

(52) U.S. Cl.
CPC ................ *C09D 5/06* (2013.01); *C09D 7/20* (2018.01); *C09D 7/45* (2018.01); *C09D 7/61* (2018.01); *C09D 7/63* (2018.01); *C09D 7/65* (2018.01); *C09D 101/02* (2013.01); *C09D 129/04* (2013.01)

(58) Field of Classification Search
CPC ... C09D 5/06; C09D 7/20; C09D 7/45; C09D 7/61; C09D 7/63; C09D 7/65; C09D 101/02; C09D 129/04; C09D 105/04; C09D 201/00; C08K 5/0091; C08K 5/23;

C08K 9/06; C08K 3/041; C08K 5/053; C08K 5/3447; C08K 5/357; C08K 5/098; C08L 2205/025; C08L 29/04
See application file for complete search history.

(56) References Cited

U.S. PATENT DOCUMENTS 4,803,192 A * 2/1989 Saeki ...................... G03C 1/73
503/212

FOREIGN PATENT DOCUMENTS

| | | | | |
|---|---|---|---|---|
| CN | 108410236 | 8/2018 | | |
| JP | 52-120028 | 10/1977 | | |
| JP | 56-159262 | 12/1981 | | |
| JP | 58-096661 | 6/1983 | | |
| JP | 59-84955 | 5/1984 | | |
| JP | S5984955 A | * | 5/1984 | |
| JP | 4-225076 | 8/1992 | | |
| JP | 2007-9198 | 1/2007 | | |
| JP | 2018-127558 | 8/2018 | | |
| JP | 2019-123848 | 7/2019 | | |
| JP | 2019123848 A | * | 7/2019 | ........... C09D 103/02 |
| JP | 2019-206646 | 12/2019 | | |
| WO | WO-2024063153 A1 | * | 3/2024 | .............. B01J 20/26 |

OTHER PUBLICATIONS

G-Biosciences, "Nonidet P-40 Substitute Safety Data Sheet," Aug. 31, 2015, G-Biosciences, pp. 1-10 (Year: 2015).*
International Preliminary Report on Patentability issued May 17, 2022 in International (PCT) Application No. PCT/JP2019/047332.
International Search Report (ISR) issued Feb. 10, 2020 in International (PCT) Application No. PCT/JP2019/047332.
Chinese Office Action issued Sep. 2, 2022 in corresponding Chinese Patent Application No. 201980102703.6, with English translation.

* cited by examiner

*Primary Examiner* — Robert S Jones, Jr.
*Assistant Examiner* — Joshua Caleb Bledsoe
(74) *Attorney, Agent, or Firm* — WENDEROTH, LIND & PONACK, L.L.P.

(57) ABSTRACT

Provided is a water-soluble sheet-like coloring material in which sheets are less likely to stick to each other, have appropriate self-standing property and flexibility, and can be quickly brought into a uniform state when dissolved in water.
A water-soluble sheet-like coloring material including a film-forming water-soluble polymer; a dissolution accelerator; a colorant; and a moisture-retaining agent.

9 Claims, No Drawings

WATER-SOLUBLE SHEET-LIKE COLORING MATERIAL, WATER-SOLUBLE SHEET-LIKE COLORING MATERIAL SET, AND PAINT SET

TECHNICAL FIELD

The present invention relates to a water-soluble sheet-like coloring material and a production method. The water-soluble sheet-like coloring material can be used as a water-color paint or an ink by being dissolved in water.

BACKGROUND ART

The watercolor paint is generally in the form of liquid or paste, but as other forms, powdery or granular paint, or paint fixed in a solid state on a pallet or the like is also present. Furthermore, sheet-like paints have also been proposed (Patent Literatures 1 and 2). In particular, the sheet-like paints are required to be less likely to stick to each other, to have appropriate self-standing property and flexibility, and to be quickly brought into a uniform state when dissolved in water, and improvement of these points has been required.

CITATION LIST

Patent Literature

Patent Literature 1: JP S59-84955 A
Patent Literature 2: JP H04-225076 A

SUMMARY OF THE INVENTION

Object of the Invention

In view of the above problems, the present invention provides a water-soluble sheet-like coloring material in which sheets are less likely to stick to each other, have appropriate self-standing property and flexibility, and can be quickly brought into a uniform state when dissolved in water.

Solution to Problem

The water-soluble sheet-like coloring material according to the present invention includes a film-forming water-soluble polymer, a dissolution accelerator, a colorant, and a moisture-retaining agent.

A water-soluble sheet-like coloring material set according to the present invention includes a combination of a first water-soluble sheet coloring material containing a film-forming water-soluble polymer, a dissolution accelerator, a first colorant, and a moisture-retaining agent and a second water-soluble sheet coloring material containing a film-forming water-soluble polymer, a dissolution accelerator, a second colorant, and a moisture-retaining agent, wherein the first colorant and the second colorant are different from each other.

A paint set according to the present invention includes a water-soluble sheet-like coloring material according to the present invention and a brush.

Advantageous Effects of the Invention

The water-soluble sheet-like coloring material according to the present invention has low adhesiveness, moderate self-standing property and flexibility, and excellent handleability. In particular, since it is in the form of a sheet, it is easy to adjust the concentration by separating an appropriate amount by, for example, tearing with hand or cutting with scissors before dissolution. In addition, since the water-soluble sheet-like coloring material according to the present invention is quickly brought into a uniform state when dissolved in water, excellent handwriting without color unevenness can be obtained when drawing is performed using a brush, and the color developability is also excellent. In addition, since the color of the water-soluble sheet-like coloring material according to the present invention is close to the color when drawing, the visibility is excellent.

BEST MODE FOR CARRYING OUT THE INVENTION

Hereinafter, embodiments of the present invention will be described in detail. In the present specification, unless otherwise specified, "part", "%", "ratio", and the like indicating the formulation are on a mass basis, and the content is % by mass of the constituent components based on the mass of the water-soluble sheet-like coloring material.

<Water-Soluble Sheet-Like Coloring Material>

The water-soluble sheet-like coloring material (hereinafter, may be referred to as a sheet-like coloring material) according to the present invention includes a film-forming water-soluble polymer, a dissolution accelerator, a colorant, and a moisture-retaining agent.

The sheet-like coloring material according to the present invention is a solid having moderate self-standing property and flexibility. Since the shape is a sheet, it is easy to cut, and a container to be accommodated is not necessary, and the sheet itself can be handled one by one, so that the handleability is also excellent. A typical example of the sheet-like shape is a film having a uniform thickness, but the thickness may be partially changed to facilitate cutting at a thin portion. However, since the sheet-like coloring material according to the present invention has high color developability, sufficient color development can be obtained even in a relatively thin shape, and thus sufficient characteristics can be exhibited even in a thin film shape having a uniform thickness. The average film thickness of such a sheet-like coloring material is not particularly limited, and is preferably 5 to 300 μm, and more preferably 10 to 150 μm. In a case of a production method using a bar coater, the average film thickness is preferably 10 to 60 μm. Here, the average film thickness can be measured by a microgauge. The sheet-like coloring material having such an average film thickness has the flexibility even in a dry state, and can realize sufficient strength for handlability. In addition, the sheet-like coloring material according to the present invention has low adhesiveness, and the component hardly adheres to the hand when the sheet-like coloring material is held by the hand. In addition, even when a plurality of sheets are stored in an overlapping manner, the sheets hardly adhere to each other.

When the sheet-like coloring material according to the present invention is brought into contact with water, the sheet-like coloring material is dissolved into a liquid composition. This liquid composition can be used in the same manner as those obtained by dispersing commonly used paints in water, painting material, and the like. The temperature of water to be used is not particularly limited as long as it can be dissolved in water at about room temperature. A method for contacting with water is not particularly limited, and examples thereof include bringing a brush containing water into contact with a sheet-like coloring material and rubbing the same, dropping water on the sheet-like coloring material with a dropper or the like, immersing a sheet-like coloring material having an appropriate size in water, and the like. If necessary, the sheet-like coloring material may be put in water and stirred using a brush or the like.

In the sheet-like coloring material according to the present invention, since the colorant is uniformly dispersed, when the sheet-like coloring material is brought into contact with water, the sheet-like coloring material can be quickly formed into a uniform liquid paint. When the paint is impregnated into a brush or the like and drawn, an excellent handwriting (drawing handwriting) without color unevenness is obtained.

Hereinafter, components used in the water-soluble sheet-like coloring material according to the present invention will be described.

[Film-Forming Water-Soluble Polymer]

The film-forming water-soluble polymer used in the present invention is a main material for maintaining the shape of the sheet-like coloring material as described above, and can be dissolved in water after film formation. In addition, it can also play a role of forming a colored film when drawing is performed by dissolving the sheet-like coloring material in water.

A film-forming water-soluble polymer according to the present invention is not particularly limited as long as it maintains the shape of the sheet-like coloring material and can be dissolved in water after film formation as described above, and a synthetic polymer or a polymer derived from a natural product can be used. Specifically, examples of the synthetic polymer include polyvinylalcohol, polyvinylpyrrolidone, a water-soluble acrylic polymer, and the like, and examples of the polymer derived from a natural product include gelatin, casein, polysaccharide, and the like.

Examples of the polysaccharide include starch, sodium alginate, pullulan, xanthan gum, welan gum, succinoglycan, guar gum, locust bean gum, carrageenan, diutan gum, cellulose such as fermented cellulose, methylcellulose, ethylcellulose, hydroxyethylcellulose, hydroxypropylcellulose, hydroxypropylmethylcellulose, and carboxymethylcellulose, and derivatives thereof. The mass average molecular weight of the polysaccharide is preferably 1,000 to 6,000,000, more preferably 100,000 to 1,500,000, and still more preferably 200,000 to 600,000. Within this range, a film having high self-standing property can be formed, and the resolubility in water is high. Here, in the present invention, the mass average molecular weight can be measured by a general method using gel permeation chromatography.

Polyvinylalcohol or polysaccharide are preferable, polyvinylalcohol, sodium alginate, pullulan, and cellulose and derivatives thereof are more preferable, polyvinylalcohol and pullulan are still more preferable, and pullulan is particularly preferable.

When polyvinylalcohol is used as the film-forming water-soluble polymer, the polymerization degree is preferably 1,500 to 5,000, and more preferably 2,000 to 4,500. Within this range, a film having high self-standing property can be formed, and the resolubility in water is high. The degree of saponification is preferably 70% by mol or more and less than 98% by mol. The content is more preferably 85 to 90% by mol. Within this range, solubility in water is high, and redissolution can be easily performed.

When polyvinylpyrrolidone is used as the film-forming water-soluble polymer, the K value thereof is preferably 60 to 200, and more preferably 70 to 130. The K value refers to a viscosity characteristic value correlated with the molecular weight, and can be calculated, for example, by applying a relative viscosity value at 25° C. measured by a capillary viscometer to the following Fikentscher's equation.

$$K \text{ value}=(1.5 \log \eta_{rel}-1)/(0.15+0.003c)+(300c \log \eta_{rel}+(c+1.5c \log \eta_{rel})^2)^{1/2}/(0.15c+0.003c^2)$$

wherein:

$\eta^{rel}$ represents the relative viscosity of a polyvinylpyrrolidone aqueous solution with respect to water, c represents the concentration (% by mass) of polyvinylpyrrolidone in a polyvinylpyrrolidone aqueous solution.

When cellulose and derivatives thereof are used as the film-forming water-soluble polymer, it is preferable to use cellulose in the form of a cellulose nanofiber obtained by processing cellulose.

Use of the cellulose nanofibers is preferable because adhesion between sheets, so-called blocking, can be prevented. The cellulose nanofibers used in the present invention are cellulose homogeneously micronized at a nano level by physically or chemically treating cellulose fibers, and are fibers having a fiber diameter of 1 to 100 nm and a fiber length of 5 μm or more and having a large aspect ratio. In the present invention, so-called cellulose nanocrystals having a fiber diameter of about 3 to 70 nm and a fiber length of about 100 to 500 nm obtained by further treating cellulose nanofibers or the like are also included in the cellulose nanofibers.

As the film-forming water-soluble polymer, a combination of two or more polymers can also be used.

Preferably, polyvinylalcohol having a polymerization degree of 1,500 to 5,000 and cellulose or a derivative thereof are used in combination, and more preferably, polyvinylalcohol having a polymerization degree of 1,500 to 5,000 and a cellulose nanofiber are used in combination. In this case, since a surface of a film is improved as shown in a plane of paper as compared with the case of using each film alone, a film having high self-standing property is formed. This is because blocking between sheets can be prevented while maintaining a state of high resolubility in water.

At this time, the mass ratio of polyvinylalcohol:cellulose nanofibers having a polymerization degree of 1,500 to 5,000 is preferably 1:0.01 to 1:15, and more preferably 1:0.1 to 1:5.

The content of the film-forming water-soluble polymer is preferably 0.05 to 20% by mass, more preferably 0.1 to 15% by mass, still more preferably 0.1 to 5% by mass, and particularly preferably 0.5 to 5% by mass, based on the total mass of the sheet-like coloring material.

[Dissolution Accelerator]

The dissolution accelerator used in the present invention has relatively high water solubility and assists the dissolution of a water-soluble film-forming polymer having relatively low water solubility, and has an action of promoting the dissolution when the sheet-like coloring material is brought into contact with water, and also has an action of uniformly dispersing the colorant when the sheet-like coloring material is dissolved in water. The water solubility of this dissolution accelerator is generally higher than the water solubility of the film-forming water-soluble polymer.

Examples of the dissolution accelerator used in the present invention include polyvinylalcohol, polyvinylpyrrolidone, polyethylene glycol, polyethylene oxide, and fatty acid metal salts.

When polyvinylalcohol is used as a dissolution accelerator, the polymerization degree is preferably 200 to 1,400, and more preferably 300 to 1,000. The degree of saponification is preferably 70% by mol or more and less than 98% by mol, and more preferably 85% to 90% by mol.

When polyvinylpyrrolidone is used as a dissolution accelerator, the K value thereof is preferably 10 to 50 and more preferably 20 to 40. The K value has the same meaning as described above.

The fatty acid metal salt is preferably a metal salt of fatty acid having 12 or more carbon atoms, and specific examples thereof include lithium stearate, sodium stearate, potassium stearate, lithium palmitate, sodium palmitate, potassium palmitate, lithium myristate, sodium myristate, potassium myristate, lithium laurate, sodium laurate, potassium laurate, lithium oleate, sodium oleate, potassium oleate, lithium isostearate, sodium isostearate, and potassium isostearate. However, since the fatty acid metal salt is contained, foaming may occur when the fatty acid metal salt is dissolved in water, it is also a preferred embodiment that the fatty acid metal salt is not contained.

A particularly preferred dissolution accelerator is the polyvinylalcohol described above.

As the dissolution accelerator, two or more kinds thereof can be used in combination.

Particularly preferably, polyvinylalcohol having a polymerization degree of 200 to 1,400 and a metal salt of fatty acid are used in combination as the dissolution accelerator. This is because, in this case, the resolubility and the uniform dispersibility of the colorant can be further improved as compared with the case where each of them is used alone. A combination of polyvinylalcohol having a polymerization degree of 200 to 1,400 and potassium oleate is preferable.

In particular, the mass ratio of polyvinylalcohol:potassium oleate having a polymerization degree of 200 to 1,400 is preferably 1:0.05 to 1:10, and more preferably 1:0.15 to 1:5.

The content of the dissolution accelerator is preferably 1% to 70% by mass, more preferably 5% to 50% by mass, still more preferably 5% to 35% by mass, and particularly preferably 10% to 35% by mass, based on the total mass of the sheet-like coloring material.

In the present invention, each of the film-forming water-soluble polymer and the dissolution accelerator may be polyvinylalcohol. The polyvinylalcohol may have a function of a film-forming water-soluble polymer or a function of a dissolution accelerator depending on the polymerization degree. Therefore, in this case, it is preferable that the distribution of the polymerization degree has two maxima in the range of the polymerization degree of 1,500 to 5,000 and the range of the polymerization degree of 200 to 1,400.

[Colorant]

In the present invention, any known pigment or dye in the related art can be used.

The colorant is preferably a pigment. The pigment is not particularly limited, and examples thereof include inorganic, organic, and processing pigments, and specific examples thereof include carbon black, aniline black, ultramarine, chrome yellow, titanium oxide, iron oxide, a phthalocyanine pigment, an azo pigment, a quinacridone pigment, a quinophthalone pigment, a styrene pigment, a triphenylmethane pigment, a perinone pigment, a perylene pigment, a dioxazine pigment, and a glitter pigment, a microcapsule pigment, and a coloring resin pigment. As the pigment, a water-dispersible pigment product dispersed in a medium in advance using a pigment dispersant such as a surfactant may be used.

The glitter pigment refers to particles having an interface having a property of specularly reflecting light. As the glitter pigment particles, metal pigment particles selected from the group consisting of metal aluminum (hereinafter, may be simply referred to aluminum), brass, stainless steel, bronze, iron oxide, aluminum oxide, alloys thereof, and the like, and inorganic material particles such as mica and pearl mica can be used. A metal vapor-deposited powder pigment formed by vapor-depositing metal on a resin, glass, or the like can also be used as the glitter pigment particles similarly to the metal pigment particles described above. Among them, an aluminum pigment is preferable because the dispersibility of the glitter pigment particles in the sheet-like coloring material can be improved, an excellent film can be formed, and the dispersibility of the glitter pigment when the sheet-like coloring material is dissolved in water can be improved.

The glitter pigment particles are preferably surface-coated from the viewpoint of low reactivity with a solvent such as water, high stability, ease of production of the sheet-like coloring material, and improvement of stability when the sheet-like coloring material is dissolved in water. The surface-coating can be performed with silica, a phosphate, molybdenum, silicate, phosphate ester, other surfactants (for example, polyoxyethylene alkyl ether, phosphoric acid derivative, and alkyl sulfonate), or the like. Among them, it is preferably surface-coated with phosphoric acid ester or silica from the viewpoint of excellent dispersibility when dissolved in water, and it is more preferably surface-coated with silica from the viewpoint of being more stable.

The coating amount of the metal pigment with silica or the like, that is, the ratio of the mass of the coating material with silica or the like to 100 parts by mass of the metal pigment particles is preferably 3 parts by mass or more and 45 parts by mass or less, more preferably 5 parts by mass or more and 30 parts by mass or less, preferably 10 parts by mass or more and 30 parts by mass or less, and more preferably 11 parts by mass or more and 20 parts by mass or less. By setting the coating amount within the above numerical range, the dispersibility can be further improved.

In the present invention, the metal pigment particles as described above may be used alone, or two or more kinds thereof may be used in combination. By using the metal pigment particles in combination, it is also possible to increase variations in color tone and increase color density. As a result, more various color tones can be easily expressed.

The shape of the glitter pigment can be optionally selected, and is preferably a needle shape, a plate shape, or a square shape from the viewpoint of glitter.

The glitter pigments are classified into those of a leafing type in which the glitter pigments are arranged in parallel to the film surface in the film and those of a non-leafing type in which the glitter pigments are dispersed and arranged in the film. The leafing type particles have high brightness, but when further containing non-glitter pigment particles, the particles tend to mask the colorant and lower the colorability. On the other hand, when non-leafing type particles further contain non-glitter pigment particles, the particles tend to be dispersedly arranged with the colorant and have excellent colorability. The sheet-like coloring material according to the present invention can contain an additional colorant, and as described later, it is also a preferable aspect to use the sheet-like coloring material in combination with a sheet-like coloring material containing non-glitter pigment particles, and in that case, the non-leafing type particles are superior in the colorability. Therefore, in consideration of the colorability, the glitter pigment particles are preferably of a non-leafing type.

In the present invention, the non-glitter pigment particles refer to colorants other than the glitter pigment particles.

The average particle diameter of the glitter pigment particles is preferably 1 μm or more, and preferably 3 μm or more in consideration of sufficiently obtaining the water-soluble sheet shape and the brightness of the handwriting to be obtained. In addition, in consideration of moldability, film strength, and the like, the average particle diameter of the glitter pigment particles is preferably 50 μm or less, more preferably 30 μm or less, still more preferably 20 μm or less, and particularly preferably 15μ or less.

By setting the average particle diameter of the glitter pigment particles within the above numerical range, the redispersibility of the glitter pigment particles in an aqueous ink composition can be improved while maintaining the brightness of the water-soluble sheet-like coloring material.

In the present invention, unless otherwise specified, the "average particle diameter" refers to a volume-based average particle diameter, and can be measured by a particle diameter (D50) at 50% in volume accumulation of a particle size distribution measured based on a calibration value using a standard sample or another measurement method using a laser diffraction particle size distribution measuring machine (trade name: MicrotracHRA 9320×100, Nikkiso Co., Ltd.).

When the average particle diameter and the average thickness of the glitter pigment particles are defined as D μm and d μm, respectively, the aspect ratio (D/d) of the glitter pigment particles is preferably 1 or more and 100 or less, and more preferably 10 or more and 50 or less. By setting the aspect ratio (D/d) of the glitter pigment particles within the above numerical range, the brightness of the aqueous ink composition can be improved, and ink clogging at the pen tip can be prevented.

The specific gravity of the glitter pigment particles is preferably 1.5 to 3.0 from the viewpoint of dispersibility.

In the present invention, the colored resin particle pigment refers to a pigment in which resin particles are colored with a colorant. Here, the colorant is not particularly limited as long as it can color the resin particles, and any pigment or dye can be used.

The resin particles are preferably styrene-acrylonitrile resin particles (hereinafter, may be referred to as SA resin particles) because they are excellent in alkali resistance, acid resistance, and heat resistance, have high stability even when various additives and the like are present, and are hardly affected by thermal environmental properties.

The SA resin particles are resin particles obtained by copolymerizing styrene and acrylonitrile as monomers. A blending ratio of styrene and acrylonitrile is not particularly limited, and generally 10% to 90% by mol of styrene and 90% to 10% by mol of acrylonitrile are blended. Monomers other than styrene and acrylonitrile can be combined as long as the effect of the present invention is not impaired.

The SA resin particles can be obtained by any known method in the related art, but in consideration of the color developability and stability of the sheet-like coloring material, the SA resin particles are preferably resin particles obtained by emulsion polymerization of styrene and acrylonitrile, in which uniform particles are easily obtained. Furthermore, the SA resin particles are preferably used as a SA resin particle dispersion in a state of being dispersed in a dispersion medium such as water in advance. As the SA resin particle dispersion, a commercially available product can also be used.

The size of the resin particles is not particularly limited, and the average particle diameter is preferably 0.05 to 3 μm and more preferably 0.1 to 1 μm in consideration of improvement in the dispersibility and the color developability.

As the colorant of the resin particles, it is particularly preferable to use a fluorescent colorant. This is because when a handwriting is formed on black paper or the like, high visibility and a special aesthetic appearance can be imparted. Examples of the fluorescent colorant include fluorescent dyes and fluorescent pigments. Among the fluorescent colorants, a fluorescent dye is preferably used because of high visibility of the handwriting on black paper or the like and the high stability with resin particles containing styrene-acrylonitrilyl. Specific examples of such fluorescent dyes include basic dyes having a xanthene skeleton, a triaryl skeleton, or an azo skeleton, and disperse dyes. Among them, basic dyes having a xanthene skeleton or an azo skeleton are preferable from the viewpoint of higher visibility of the handwriting. Examples of such fluorescent dyes include Direct Yellow 85, Basic Yellow 1, Basic Yellow 40, Basic Red 1, Basic Red 1:1, Basic Violet 10, Basic Violet 11:1, Acid Yellow 7, Acid Red 92, Acid Blue 9, Disperse Yellow 82, Disperse Yellow 121, and the like. Particularly preferably, the colored resin particles are a combination of the SA resin particles and fluorescent dyes.

Specific examples of the commercially available product containing the colored resin particles include the SINLOIHI Color series (available from SINLOIHI Company, Limited), Lumicol series (available from Nippon Fluorescent Chemical Co., Ltd.), LM series (available from FUJI Dye Co., Ltd.), and Epocolor series (available from Nippon Shokubai Co., Ltd.). Specific examples of the Lumicol series include NKW-2317H, NKW-6307H, NKW-2308H, NKW-2302H, NKW-2305H, and NKW-6305H of the same. In addition, examples of the single color series include single color base SW-11, SW-12, SW-13, SW-14, SW 15, SW-16, SW-17, SW-18, SW-27, SW-37, SW-47, SF-1012, SF-1013, SF-1014, SF-1015, SF-1017, SF-1027, SF-1038, and SF-5015.

Titanium oxide is generally used as a white pigment, but at the same time, the concealing property of the handwriting formed by drawing can be improved. Therefore, it also has a function as a masking material. Therefore, when the other pigment further contains titanium oxide, the handwriting density can be improved when a pattern is drawn using the titanium oxide.

In addition, the color of the sheet-like coloring material itself and the color when the sheet-like coloring material is dissolved in water and drawn may be recognized differently due to the influence of reflection, absorption, and the like. However, by including titanium oxide, the color of the sheet-like coloring material itself and the color when the sheet-like coloring material is dissolved in water can be brought close to each other. As a result, it is possible to easily select the coloring material intended by the user at the time of drawing. When titanium oxide is contained for this purpose, the content of titanium oxide is preferably 0.1% to 50% by mass with respect to other pigments.

An extender can be combined with the pigment. Here, in the present invention, the extender refers to an extender that has low colorability and concealing property of itself, but can suppress the pigment from sinking between paper fibers and the like, and can scatter light, and can enhance the concealing property and color developability by combining with the pigment. By containing the extender, the strength of the film can be increased, the thickness of the film thickness can be increased, and dissolution when the sheet-like coloring material is brought into contact with water can be promoted. Specific examples thereof include kaolin, talc, mica, clay, bentonite, calcium carbonate, barium sulfate, and aluminum hydroxide, and kaolin is preferable. Kaolin can be classified into hydrous kaolin (wet kaolin), calcined kaolin, and dry kaolin due to a difference in the production method thereof, is excellent in the solubility and the dispersibility, and is easily used for producing a sheet-like coloring material.

In particular, the combination of titanium oxide and kaolin is preferable because the whiteness is improved.

Since some of these extenders are not colorless, they also have a function as a colorant.

The content of the extender is preferably 5% to 50% by mass, more preferably 10% to 40% by mass, and still more preferably 10% to 30% by mass based on the total mass of the sheet-like coloring material.

The content of the extender is preferably 10% to 70% by mass, and more preferably 20% to 60% by mass, based on the total mass of the extender and the colorant.

Furthermore, in consideration of the excellent color developability, film strength, and resolubility of the water-soluble sheet, the content of the dissolution accelerator is preferably 5% to 500% by mass, more preferably 5% to 300% by mass, and still more preferably 10% to 150% by mass, based on the total mass of the colorant and the extender.

Examples of the dyes include phthalocyanine dyes, pyrazolone dyes, nigrosine dyes, anthraquinone dyes, and azo dyes.

The colorant may be used alone or in combination of two or more kinds as appropriate depending on the intended quality such as transparency and concealing property.

The content of the colorant varies depending on the type, and is preferably 5% to 70% by mass, more preferably 10% to 65% by mass, and still more preferably 20% to 65% by mass, based on the total mass of the sheet-like coloring material, from the viewpoint of color development and drawing property.

[Moisture-Retaining Agent]

The moisture-retaining agent used in the present invention has an action of suppressing excessive drying of the sheet-like coloring material and appropriately wetting the sheet-like coloring material. For this reason, a compound which is hardly evaporated is preferable. The moisture-retaining agent also has an action of preventing aggregation of the colorant in the sheet-like coloring material and imparting plasticity to the coating film. The moisture-retaining agent is generally selected from compounds having a plurality of hydroxy groups, and is preferably polyol (polyhydric alcohol).

The moisture-retaining agent used in the present invention is preferably diol or triol. Specific examples thereof include ethylene glycol, diethylene glycol, propylene glycol, and glycerin, and glycerin is particularly preferable.

In addition, in order for the sheet-like coloring material to maintain a sheet shape having sufficient strength, the content of the moisture-retaining agent is preferably 0.5% to 30% by mass, more preferably 1% to 25% by mass, and still more preferably 1% to 10% by mass, based on the total mass of the sheet-like coloring material.

[Other Additives]

The water-soluble sheet-like coloring material according to the present invention can contain optional additives as necessary.

Examples of the additive that can be used include a viscosity modifier, an application performance improver, an antiseptic, a surfactant, and an antifoaming agent. In addition, those that can be usually used for an aqueous paint can also be included.

Among them, the surfactant can be used as a wettability improver at the time of drawing. As the surfactant, a nonionic surfactant, a cationic surfactant, an anionic surfactant, or a zwitterionic surfactant is known, and the surfactant can be appropriately selected and used.

Examples of the surfactant include a fluorine-based surfactant, a silicone-based surfactant, a surfactant having an acetylene bond in the structure, and a phosphoric acid ester-based surfactant. In the present invention, in consideration of improvement in wettability at the time of drawing, it is more preferable to use one or more selected from a fluorine-based surfactant, a silicone-based surfactant, and a surfactant having an acetylene bond in the structure. Among them, it is still more preferable to use a surfactant having an acetylene bond in the structure.

Examples of the surfactant having an acetylene bond in the structure include an acetylene alcohol surfactant and an acetylene glycol surfactant, and among them, it is particularly preferable to use an acetylene glycol surfactant. The sheet-like coloring material according to the present invention may contain water. Such water may be added as a solvent, a solvent such as a colorant or a surfactant, or a dispersion medium. Such water may be evaporated and removed in a production method described later, or a part thereof may remain in the water-soluble sheet-like coloring material.

<Method for Producing Water-Soluble Sheet-Like Coloring Material>

The method for producing the water-soluble sheet-like coloring material according to the present invention is not particularly limited, and for example, the water-soluble sheet-like coloring material can be produced as follows.

A mixture containing a film-forming water-soluble polymer, a dissolution accelerator, a colorant, a moisture-retaining agent, and water is stirred to prepare a uniform dispersion. When the colorant is a pigment, it is preferable to use a colorant dispersed in a dispersion medium in advance.

Next, the dispersion is applied onto a resin film as a base by a bar coater, an applicator, or the like, and then dried and peeled off from the resin film as a base, whereby a sheet-like coloring material can be produced.

As another method, a uniform sheet-like coloring material can be produced by kneading a mixture containing a film-forming water-soluble polymer, a dissolution accelerator, a colorant, a moisture-retaining agent, and water as necessary with a kneader or the like, extruding the kneaded product, and being subjected to a calendering treatment, a rolling treatment, or the like as necessary.

<Water-Soluble Sheet-Like Coloring Material Set>

A water-soluble coloring material set according to the present invention includes a combination of a first water-soluble sheet coloring material containing a film-forming water-soluble polymer, a dissolution accelerator, a first colorant, and a moisture-retaining agent and a second water-soluble sheet coloring material containing a film-forming water-soluble polymer, a dissolution accelerator, a second colorant, and a moisture-retaining agent, wherein the first colorant and the second colorant are different from each other.

The first and second water-soluble sheet-like coloring materials are the sheet-like coloring materials according to the present invention described above.

The first water-soluble sheet-like coloring material and the second water-soluble sheet-like coloring material each contain a film-forming water-soluble polymer and a dissolution accelerator. These may be the same or different in the first water-soluble sheet-like coloring material and the second water-soluble sheet-like coloring material. From the viewpoint of the compatibility and ease of production when the first water-soluble sheet-like coloring material and the second water-soluble sheet-like coloring material are mixed, it is common to use the same film-forming polymer and dissolution accelerating material, but different film-forming polymers and dissolution accelerating materials may be used in consideration of compatibility, stability, and the like with the colorant to be used.

By using the first and second water-soluble sheet-like coloring materials in combination, a picture having a new color can be formed.

Furthermore, three or more sheet-like coloring materials can be combined.

A water-soluble sheet-like coloring material set in which the first colorant is a glitter pigment and the second colorant is a colorant that is not a glitter pigment is also a preferred embodiment. For example, a gold paint can be formed by bringing the first water-soluble sheet-like coloring material having a silver color and the second water-soluble sheet-like coloring material having an orange color into contact with water and dissolving the first water-soluble sheet-like coloring material and the second water-soluble sheet-like coloring material. At this time, it is preferable that the first water-soluble sheet-like coloring material and the second water-soluble sheet-like coloring material each contain an extender. The content X % by mass of the extender contained in the first water-soluble sheet-like coloring material based on the total mass of the first water-soluble sheet-like coloring material and the content Y % by mass of the extender contained in the second water-soluble sheet-like coloring material based on the total mass of the second water-soluble sheet-like coloring material preferably satisfy $0.5 < X/Y < 1.5$, more preferably $0.7 < X/Y < 1.3$, and still more preferably $0.8 < X/Y < 1.0$. Thus, even when the sheet-like coloring material is mixed, the color developability can be maintained.

In a preferred aspect, colored resin particles, particularly fluorescent colored resin particles are selected as the first colorant, and a white pigment such as titanium oxide is selected as the colorant that is not the colored resin particle, as the second colorant. It is easy to form a pastel handwriting having a pale color desired by the user, and the handwriting is excellent in color developability and concealing property even for black paper or the like, which is effective.

<Paint Set>

A paint set according to the present invention includes a sheet-like coloring material according to the present invention or a sheet-like coloring material set according to the present invention and a brush. Furthermore, a container for containing water, a pallet, and the like can be combined. The paint set according to the present invention can be used not only for drawing but also for calligraphic works. For example, in a case where the sheet-like coloring material according to the present invention is black, the sheet-like coloring material can be used as India ink, and can be used for a painting purpose together with a brush.

EXAMPLES

Hereinafter, the present invention will be described in more detail with reference to Examples, but the present invention is not limited to these examples.

Example 1

(1a) Production of Coloring Composition for Producing Sheet-Like Coloring Material Film-forming water-soluble polymer 10 parts by mass (polyvinylalcohol I, 10% by mass of aqueous solution, polymerization degree 3,300, saponification degree 86.5% to 89.5% by mol)

Dissolution accelerator 30 parts by mass (polyvinylalcohol III, 20% by mass of aqueous solution, polymerization degree 500, saponification degree 87.0% to 89.0% by mol)

Colorant 45 parts by mass (containing black pigment dispersion, Pigment black 7, 20% by mass of aqueous dispersion, 10% by mass of diethylene glycol)

Moisture-retaining agent (glycerin) 10 parts by mass

Water 29 parts by mass

The above formulation was stirred and mixed at room temperature for 1 hour to obtain a coloring composition for producing a sheet-like coloring material.

(1b) Production of Sheet-Like Coloring Material

The colorant composition obtained in the above (1a) was applied onto a 100 μm polypropylene sheet using a bar coater, and dried at 50° C. for 12 hours to obtain a film-like product in which the composition had a film shape on a polypropylene film. The film-like product was peeled off from the polypropylene film to obtain a black sheet-like coloring material.

Examples 2 to 55 and Comparative Examples 1 to 3

(a) Production of Coloring Composition for Producing Sheet-Like Coloring Material A coloring composition for producing a sheet-like coloring material was produced by the same method as in Example 1 except that the formulation was changed to those shown in the following Tables 1-1 and 1-2. A sheet-like coloring material was obtained in the same manner as in Example 1 using the obtained coloring composition. The numerical value of the composition in the table indicates parts by mass.

TABLE 1-1

| | | | Examples | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| Composition | Film-forming polymer | Polyvinylalcohol I | 10 | 10 | 10 | 10 | | | | | | | | | | | | | | | | | | | | | | | | | |
| | | Cellulose nanofiber | | | | | 5 | 5 | 5 | 5 | 5 | 5 | 5 | 5 | 5 | 5 | 5 | 7 | 4 | | | 5 | 5 | 5 | 5 | 5 | 5 | 5 | 5 | 3 | 8 |
| | | Pullulan aqueous solution | | | | | | | | | | | | | | | | | | 20 | | | | | | | | | | | |
| | | Sodium alginate aqueous solution | | | | | | | | | | | | | | | | | | | 35 | | | | | | | | | | |
| | | Polyvinylalcohol II | | | | | | | | | | | | | | | | | | | | | | | | | | | | | |
| | Dissolution accelerator | Polyvinylalcohol III | 30 | 10 | 20 | 50 | 30 | 30 | 30 | 30 | 30 | 30 | 30 | 30 | 35 | 17 | 31 | 62 | 35 | 20 | 35 | 28 | 30 | 35 | 30 | 30 | 40 | 40 | 40 | 30 | 40 |
| | | Polyvinylalcohol IV | | | | | | | | | | | | | | | | | | | | | | | | | | | | | |
| | | Polyvinylpyrrolidone aqueous solution | | | | | | | | | | | | | | | | | | | | | | | | | | | | | |
| | | Potassium oleate aqueous solution | | | | | | | | | | | | | | | | | | | | | | | | | | | | | |
| | Colorant | Black pigment dispersion | 30 | 30 | 30 | 30 | 25 | 30 | | | | | | | | 30 | 30 | 30 | 30 | 30 | 30 | 28 | 30 | 25 | 30 | 30 | 20 | 15 | 10 | 10 | 10 |
| | | Red pigment dispersion | | | | | | | 30 | | | | | | 30 | | | | | | | | | | | | 30 | 30 | 30 | | |
| | | Blue pigment dispersion1 | | | | | | | | 30 | | | | | | | | | | | | | | | | | | 30 | 30 | 30 | |
| | | Blue pigment dispersion2 | | | | | | | | | 30 | | | | | | | | | | | | | | | | | | | | |
| | | Green pigment dispersion | | | | | | | | | | 30 | | | | | | | | | | | | | | | | | | | |
| | | Purple pigment dispersion | | | | | | | | | | | 30 | | | | | | | | | | | | | | | | | | |
| | | Yellow pigment dispersion | | | | | | | | | | | | 30 | | | | | | | | | | | | | | | | | |
| | | Silver pigment dispersion 1 | | | | | | | | | | | | | | | | | | | | 30 | | | | | | | | | |
| | | Silver pigment dispersion 2 | | | | | | | | | | | | | | | | | | | | | | | | | | | | | |
| | | Silver pigment dispersion 3 | | | | | | | | | | | | | | | | | | | | | | | | | | | | | |
| | | Silver pigment dispersion 4 | | | | | | | | | | | | | | | | | | | | | | | 20 | | | | | | |
| | | Silver pigment dispersion 5 | | | | | | | | | | | | | | | | | | | | | | | | | | | | | |
| | | Silver pigment dispersion 6 | | | | | | | | | | | | | | | | | | | | | | | | | | | | | |
| | | Silver pigment dispersion 7 | | | | | | | | | | | | | | | | | | | | | | | | | | | | | |
| | | White pigment dispersion 1 | | | | | | | | | | | | | | | | | | | | 5 | 20 | | | | | | | | |
| | | White pigment dispersion 2 | | | | | | | | | | | | | | | | | | | | | 20 | | | | | | | | |
| | | Colored resin particle dispersion 1 | | | | | | | | | | | | | | | | | | | | | | | 20 | | | | | | |
| | | Colored resin particle dispersion 2 | | | | | | | | | | | | | | | | | | | | | | | | 30 | | | | | |
| | Lubrication retainer | Glycerin | 1 | 1 | 1 | 1 | 1 | 5 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | Extender | Kaolin | | | | | | | | | | | | | | | | | | | | | | | | | | | | | | |
| | | Surfactant | | | | | | | | | | | | | | | | | | | | | | 7 | | | 1 | 5 | 10 | 10 | 10 | 1 |
| | | Ion-exchanged water | 29 | 49 | 39 | 9 | 39 | 25 | 23 | 14 | 19 | 25 | 20 | 26 | 26 | 28 | 32 | 35 | 30 | 30 | 30 | 28 | 30 | 30 | 29 | 12 | 13 | 18 | 22 | 20 | 23 |
| Evaluation | | Film thickness (μm) | 30 | 25 | 28 | 35 | 28 | 25 | 23 | 14 | 19 | 20 | 26 | 24 | 24 | 28 | 32 | 35 | 30 | 30 | 30 | 28 | 30 | 30 | 29 | 12 | 13 | 18 | 22 | 20 | 23 |
| | | Film formability | A | A | A | A | A | A | A | A | A | A | A | A | A+ | A+ | A+ | A | A | A | A | A | B | A | A | A | A | S | S | S | S | A |
| | | Drawing color reproducibility | A | A | A | A | A | A | A | A | B | C | C | A | A | A | A | A | A | A | A | A | A | A | A | A | B | B | B | B | B | A |
| | | Resolubility | C | C | A | A | C | A | A | A | A | A | A | A | B | B | B | A | A | A | C | A | A | A | A | A | A | A | A | A | A | A |
| | | Color developability | A | B | A | A | A | A | A | A | A | A | A | A | A | B | B | A | A | A | A | A | A | A | A | A | A | A | A | A | A | A |

TABLE 1-2

| Composition | | | Examples | | | | | | | | | | | | | | | | | | | | | | | | | Comparative Examples | | |
|---|---|---|---|---|---|---|---|---|---|---|---|---|---|---|---|---|---|---|---|---|---|---|---|---|---|---|---|---|---|---|---|
| | | | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 1 | 2 | 3 |
| Composition | Film forming polymer | Polyvinylalcohol II | 5 | 5 | 5 | | 5 | 5 | 5 | 5 | 5 | 5 | 5 | 5 | 5 | 5 | 5 | 3 | 8 | 5 | 5 | 5 | 5 | 5 | 5 | | | | 30 | | |
| | | Cellulose nanofiber | | | | | | | | | | | | | | | | | | 5 | | | | | | | | 5 | | | |
| | | Pullulan aqueous solution | | | | 5 | | | | | | | | | | | | | | | | | | | | | | 5 | | | |
| | | Sodium alginate aqueous solution | | | | | | | | | | | | | | | | | | | | | | | | | 5 | 5 | | | |
| | Dissolution accelerator | Polyvinylalcohol III | 40 | 40 | 30 | 30 | 40 | 40 | 40 | 40 | 40 | 40 | 40 | 40 | 40 | 40 | 40 | 30 | 40 | 40 | 40 | 40 | 40 | 40 | 40 | 40 | 40 | 40 | | 30 | 30 |
| | | polyvinylalcohol IV | 10 | 10 | | | | | | | | | | | | | | | | 10 | | | | | | | | | | | |
| | | Polyvinylpyrrolidone aqueous solution | | | 30 | 10 | 10 | 10 | 10 | 10 | 10 | 10 | 10 | 10 | 10 | 10 | 10 | 10 | 10 | 10 | | | | | | | | | | | |
| | | Potassium oleate aqueous solution | | | | | | | | | | | | | | | | | | | | 10 | | | | | | | | | |
| | Colorant | Black pigment dispersion | 30 | 30 | | 30 | | | | | | | | | | | | | | | | | | | | | | | 30 | 30 | 30 |
| | | Red pigment dispersion | | | | | | | | 1.5 | | | | | | | | | | | | | | | | | | | | | |
| | | Blue pigment dispersion1 | | | | | | | | | | | | | | | | | | | | | | | | | | | | | |
| | | Blue pigment dispersion2 | | | 30 | | | | | | | | | | | | | | | | | | | | | | | | | | |
| | | Green pigment dispersion | | | | | | | | | | | | | | | | | | | | | | | | | | | | | |
| | | Purple pigment dispersion | | | | | | | | | | | | | | | | | | | | | | | | | | | | | |
| | | Yellow pigment dispersion | | | | | | | | 28.5 | | | | | | | | | | | | | | | | | | | | | |
| | | Silver pigment dispersion 1 | | | | | 20 | 20 | | | 20 | 20 | 20 | | | | | 20 | 20 | 20 | 20 | | 10 | | | | | | | | |
| | | Silver pigment dispersion 2 | | | | | | 20 | | | | 20 | 20 | 20 | | | | 20 | 20 | | 20 | 20 | | | | | | | | | |
| | | Silver pigment dispersion 3 | | | | | | | | | | | 20 | 20 | | | | | | | | | | | | | | | | | |
| | | Silver pigment dispersion 4 | | | | | | | | | | | | | 20 | | | | | | | | | | | | | | | | |
| | | Silver pigment dispersion 5 | | | | | | | 20 | | | | | | 20 | 20 | | | | | | | | | | | | | | | |
| | | Silver pigment dispersion 6 | | | | | | | | | | | | | | 20 | 20 | | | | | | | | | | | | | | |
| | | Silver pigment dispersion 7 | | | | | | | | | | | | | | | 20 | | | | | | | | | | | | | | |
| | | White pigment dispersion 1 | | | | | | | | | | | | | | | | | | | | | | | | | | | | | |
| | | White pigment dispersion 2 | | | 30 | | | | | | | | | | | | | | | | | | | | | | | | | | |
| | | Colored resin particle dispersion 1 | | | | | | | | | | | | | | | | | | | | | | 43 | 43 | | 43 | 43 | | | |
| | | Colored resin particle dispersion 2 | | | | | | | | | | | | | | | | | | | | | | | | 45 | | | | | |
| | Lubrication retainer | Glycerin | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | Extender | Kaolin | 10 | 10 | 10 | | | | | 10 | 10 | 10 | 10 | 10 | 10 | 10 | 10 | 10 | 10 | 10 | 10 | 10 | 8 | | 10 | 10 | 5 | 3 | 39 | 39 | 39 |
| | | Surfactant | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | | | |
| | | Ion-exchanged water | 3 | 3 | 9 | 4 | 14 | 14 | 14 | 14 | 14 | 14 | 14 | 14 | 14 | 14 | 14 | 14 | 14 | 14 | 14 | 14 | 14 | 3 | 3 | 3 | 3 | 3 | 19 | | |
| Evaluation | | Film thickness (μm) | 22 | 24 | 24 | 12 | 32 | 32 | 32 | 23 | 40 | 40 | 42 | 43 | 45 | 40 | 41 | 39 | 41 | 40 | 40 | 40 | 37 | 32 | 38 | 39 | 35 | 34 | 28 | — | 19 |
| | | Film formability | S | S | S | A | S | S | S | A | S | A | A | S | S | A | S | A | A | A+ | S | A | A | S | S | S | S | S | A | D | A |
| | | Drawing color reproducibility | B | A | A | A | A | A | A | A | A | A | A | A | A | A | A | A | A | A | A | A | A | A | A | A | A | A | A | — | A |
| | | Resolubility | A | A | A | A | A | A | A | A | A | A | A | A | A | A | A | A | A | A | A | A | A | A | A | A | A | A | E | A | D |
| | | Color developability | A | A | A | A | A | A | A | A | A | A | A | A | A | A | A | A | A | A | A | A | A | A | A | A | A | A | A | A | E |

In the table:

Polyvinylalcohol I: 10% by mass of aqueous solution, polymerization degree of 3,300, saponification degree: 86.5% to 89.5% by mol, Polyvinylalcohol II: 10% by mass of aqueous solution, polymerization degree of 1,800, saponification degree: 87.0% to 89.0% by mol, Polyvinylalcohol III: 20% by mass of aqueous solution, polymerization degree of 500, saponification degree: 87.0% to 89.0% by mol, Polyvinylalcohol IV: 20% by mass of aqueous solution, polymerization degree of 300, saponification degree: 86.0% to 90.0% by mol, Cellulose nanofiber: Average fiber diameter of 10 to 50 nm, polymerization degree of 800, 2% by mass of aqueous solution, Pullulan aqueous solution: 10% by mass pullulan aqueous solution, pullulan, weight average molecular weight of about 400,000, Sodium alginate aqueous solution: 5% by mass of sodium alginate aqueous solution, mass average molecular weight of about 1,000,000, Polyvinylpyrrolidone aqueous solution: 20% by mass of polyvinylpyrrolidone aqueous solution, polyvinylpyrrolidone, K value 27.0 to 22.0, Potassium oleate aqueous solution: 20% by mass of aqueous solution, Black pigment dispersion: Pigment black 7 containing 20% by mass of aqueous dispersion, 10% by mass of diethylene glycol, Red pigment dispersion: Pigment red 170 containing 25% by mass of aqueous dispersion, 10% by mass of diethylene glycol, Blue pigment dispersion 1: Pigment blue 15 containing 25% by mass of aqueous dispersion, 10% by mass of diethylene glycol, Blue pigment dispersion 2: Pigment blue 15:3 containing 25% by mass of aqueous dispersion, 10% by mass of diethylene glycol, Green pigment dispersion: Pigment Green 7 containing 20% by mass of aqueous dispersion, 10% by mass of diethylene glycol, Purple pigment dispersion: Pigment violet 23 containing 25% by mass of aqueous dispersion, 10% by mass of diethylene glycol Yellow pigment dispersion: Pigment Yellow 151 containing 20% by mass of aqueous dispersion, 10% by mass of diethylene glycol, Silver pigment dispersion 1: Aluminum pigment "EMR-D5660", Toyo Aluminium K.K., silica-coated aluminum particles, non-leafing type, average particle diameter of 10 μm, solid content of 50%, Silver pigment dispersion 2: Aluminum pigment "EMR-D6390", Toyo Aluminium K.K., silica-coated aluminum particles, non-leafing type, average particle diameter of 7 μm, aspect ratio of 25, silica coating amount of 23 to 28 parts by mass, solid content of 40%, Silver pigment dispersion 3: Aluminum pigment "EMR-D5422", Toyo Aluminium K.K., silica-coated aluminum particles, non-leafing type, average particle diameter of 19 μm, solid content of 65%, Silver pigment dispersion 4: Aluminum pigment "FW-610", Asahi Kasei Metals Corporation, POE alkyl ether, aluminum particles surface-treated with a phosphoric acid derivative, non-leafing type, average particle diameter of 10 μm, solid content of 75%, specific gravity of 1.6, Silver pigment dispersion 5: Aluminum pigment "Roto-safe Aqua 260 003 Silver", Eckart, aluminum particles surface-treated with a phosphoric acid derivative, leafing type, average particle diameter of 10 μm, solid content of 95%, Silver pigment dispersion 6: Aluminum pigment "WXM 5660", Toyo Aluminium K.K., phosphate ester-coated aluminum particles, leafing type, average particle diameter of 10 μm, solid content of 50%, Silver pigment dispersion 7: Aluminum pigment "STAPA IL Hydrolan 9160", Eckart, silicate-coated aluminum particles, leafing type, average particle diameter of 10 μm, silicic acid coating amount of 7 parts by mass, solid content of 60%, White pigment dispersion 1: Pigment white 6 containing 70% by mass of aqueous dispersion, 4% by mass of ethylene glycol, White pigment 2: Rutile titanium oxide having an average particle diameter of 0.27 μm, Kaolin: "ASP-600", BASF, Colored resin particle dispersion 1: SA resin particles dyed with fluorescent dyes (Basic Violet 11:1, Basic Red 1:1, and Basic Yellow 40), average particle diameter of 0.4 μm, 45% aqueous dispersion, Lumicol series, available from Nippon Fluorescent Chemical Co., Ltd., Colored resin particle dispersion 2: SA resin particles dyed with fluorescent dyes (Basic Yellow 40 and Disperse Yellow 82), average particle diameter of 0.4 μm, 45% aqueous dispersion, Lumicol series, available from Nippon Fluorescent Chemical Co., Ltd., and Surfactant: Acetylene glycol-based surfactant "Dynol 604", Nissin Chemical Industry Co., Ltd.

The obtained sheet-like coloring material was evaluated as follows. The obtained results are as shown in Table 1.

[Film Thickness]

The film thicknesses of the sheet-like coloring materials of examples and comparative examples were measured. The film thickness was measured with a microgauge. In Comparative Example 2, although the film was formed, the film thickness was not able to be measured because the film was brittle.

[Evaluation of Film Formability]

The state of the film of the sheet-like coloring material of Examples 1 to 55 and Comparative Examples 1 to 3 was evaluated by palpation.

The evaluation criteria are as follows.

S: Film formability is excellent, there is no stickiness between sheets, stickiness of sheet surface is further suppressed, and sheet is easily torn.

A+: Film formability is excellent, and there is no stickiness between sheets

A: Film formability is excellent.

B: Film formability is almost excellent, but film is slightly brittle.

C: Film formation is possible, but film is slightly brittle.

D: Film formation is possible, but film is brittle and easily collapses.

E: Film formation is not possible.

All the sheet-like coloring materials of examples had moderate self-standing property and flexibility. When comparing the sheet-like coloring materials of Examples 25 to 27, it was found that the sheet-like coloring material of Example 26 has a thicker film thickness, higher film strength, and more appropriate self-standing property than the sheet-like coloring material of Example 25, the sheet-like coloring material of Example 27 has a thicker film thickness, higher film strength, and more appropriate independence than the sheet-like coloring material of Example 26. For example, when the sheet-like coloring material is peeled off from a polypropylene film during the production of the sheet-like coloring material, breakage or the like is less likely to occur, and the production of the sheet-like coloring material is easy. On the other hand, it also had ease of tearing by hand and ease of cutting using scissors or the like.

[Evaluation of Drawing Color Reproducibility]

A brush containing water at room temperature was brought into contact with and rubbed with the sheet-like coloring materials of Examples 1 to 55 and Comparative Examples 1 to 3, respectively, to obtain a uniform paint. Each of the paints was impregnated into a brush and drawn on a white sheet. The color at the time of drawing and the color of the film of the sheet-like coloring material before melting were visually compared to evaluate color reproducibility. The evaluation criteria are as follows.

A: Color at the time of drawing is the same as color of sheet, and visibility of color is excellent.

B: Color at the time of drawing and color of sheet are almost the same, and visibility of color is high.

C: Color at the time of drawing and color of sheet are slightly different from each other, but colors are visible.

D: Color at the time of drawing and color of sheet are different from each other, but colors can be recognizable.

E: Color of sheet cannot be discriminated, and color cannot be recognizable.

[Evaluation of Resolubility]

The solubility when the sheet-like coloring material was diluted with 100 times of water and the handwriting when the sheet-like coloring material was drawn were visually evaluated. The evaluation criteria are as follows.

A: Solubility is excellent, and colorant can be drawn in uniform state.

B: Slight aggregation of colorants is observed at the time of dissolution, but colorant can be drawn in uniform state.

C: A part of colorants is agglomerated at the time of dissolution, and influence thereof also appears when drawing is performed.

D: Colorants are agglomerated at the time of dissolution, and influence thereof also appears when drawing is performed.

E: Not re-dissolved, colorants are heavily aggregated and cannot be drawn.

In Examples 30 and 31 in which potassium oleate was not contained, foaming was less than that in Example 27 in which potassium oleate was contained at the time of producing the sheet-like coloring material or when the sheet-like coloring material was brought into contact with water.

[Evaluation of Color Developability]

As in the evaluation of drawing color reproducibility described above, the color developability at the time of drawing on the white sheet was visually evaluated. The evaluation criteria are as follows.

A: Color developability at the time of drawing is particularly high.

B: Color developability at the time of drawing is high.

C: Color developability at the time of drawing is slightly low.

D: Drawing is possible, but color is light and color developability is low.

E: No drawing is possible.

In addition, when the color developability was evaluated in the same manner as in the evaluation of color developability except that drawing was performed on a black sheet using the sheet-like coloring materials of Examples 21 and 22, Example 21 was evaluated as C above, whereas Example 22 was evaluated as A above.

A brush containing water at room temperature was brought into contact with a sheet-like coloring material containing colored resin particles and rubbed to form a uniform paint. Each of the paints was impregnated into a brush and drawn on the white or black sheet. The color developability at the time of drawing was visually evaluated. As a result, in the sheet-like coloring materials of Examples 52 to 55, the color developability at the time of drawing was high even in the white paper and black paper, and the concealing property was high in the black paper. The sheet-like coloring material of Example 54 had higher concealing property on the black paper than that of the sheet-like coloring material of Example 55, and the sheet-like coloring material of Example 54 had higher concealing property on the black paper than that of the sheet-like coloring material of Example 52.

The sheet-like coloring materials of Examples 23, 34 to 36, and 38 to 50 containing the glitter pigment particles all had brightness. The sheet-like coloring materials of Examples 36 and 42 to 44 containing the leafing type glitter pigment particles had higher brightness than that of the sheet-like coloring materials of Examples 23, 34, 35, 38 to 41, and 45 to 50 containing the non-leafing-type glitter pigment particles.

The sheet-like coloring materials of Examples 38 and 39 were silver sheet-like coloring materials, and the sheet-like coloring material of Example 37 was an orange coloring material. The same amount of the sheet-like coloring materials of Example 38 or 39 and the sheet-like coloring material of Example 37 were collected, brought into contact with each other with a brush containing water at room temperature, and rubbed to obtain gold uniform liquid paints. Similarly to the above, when the materials were drawn on the white or black sheet, both of them had excellent color developability. When the sheet-like coloring material of Example 34 or 35 and the sheet-like coloring material of Example 37 were used, a uniform gold liquid paint was able to be formed, but the color developability was slightly low when drawing was performed on the black sheet.

Further, when comparing a resultant (i) obtained by drawing any one of the silver sheet-like coloring materials of Examples 38 to 41 containing the non-leafing type glitter pigment particles and the orange sheet-like coloring material of Example 37 in the same amount as the above as a liquid paint, as described above, and a resultant (ii) obtained by drawing any one of the silver sheet-like coloring materials of Examples 42 to 44 containing the leafing-type glitter pigment particles and the orange sheet-like coloring material of Example 37 in the same amount as the above as a liquid paint, as described above, the resultant of (i) was more excellent in colorability and has more vivid gold color.

The invention claimed is:

1. A water-soluble sheet-like coloring material comprising: a film-forming water-soluble polymer; a dissolution accelerator; a colorant; and a moisture-retaining agent, wherein the film-forming water-soluble polymer is a polysaccharide selected from the group consisting of sodium alginate, pullulan, and cellulose and derivatives thereof; and the dissolution accelerator is selected from the group consisting of polyvinylalcohol having a polymerization degree of 200 to 1,400, polyvinylpyrrolidone and fatty acid metal salts.

2. The water-soluble sheet-like coloring material according to claim 1, wherein an average film thickness is 5 to 300 μm.

3. The water-soluble sheet-like coloring material according to claim 1, wherein the film-forming water-soluble polymer is present in an amount of 0.05% to 20% by mass based on a total mass of the water-soluble sheet-like coloring material.

4. The water-soluble sheet-like coloring material according to claim 1, comprising 1% to 70% by mass of a dissolution accelerator based on the total mass of the water-soluble sheet-like coloring material.

5. The water-soluble sheet-like coloring material according to claim 1, wherein the colorant is a pigment.

6. The water-soluble sheet-like coloring material according to claim 1, further comprising an extender.

7. The water-soluble sheet-like coloring material according to claim 1, wherein the moisture-retaining agent is a polyol.

8. A water-soluble sheet-like coloring material set comprising: a combination of a first water-soluble sheet coloring material containing a film-forming water-soluble polymer, a dissolution accelerator, a first colorant, and a moisture-retaining agent, and a second water-soluble sheet coloring material containing a film-forming water-soluble polymer, a dissolution accelerator, a second colorant, and a moisture-retaining agent, wherein the first colorant and the second colorant are different from each other;

the film-forming water-soluble polymer is a polysaccharide selected from the group consisting of sodium alginate, pullulan, and cellulose and derivatives thereof; and the dissolution accelerator is selected from the group consisting of polyvinylalcohol having a polymerization degree of 200 to 1,400, polyvinylpyrrolidone and fatty acid metal salts.

9. A paint set comprising: the water-soluble sheet-like coloring material according to claim 1; and a brush.

\*    \*    \*    \*    \*